Patented Aug. 20, 1929.

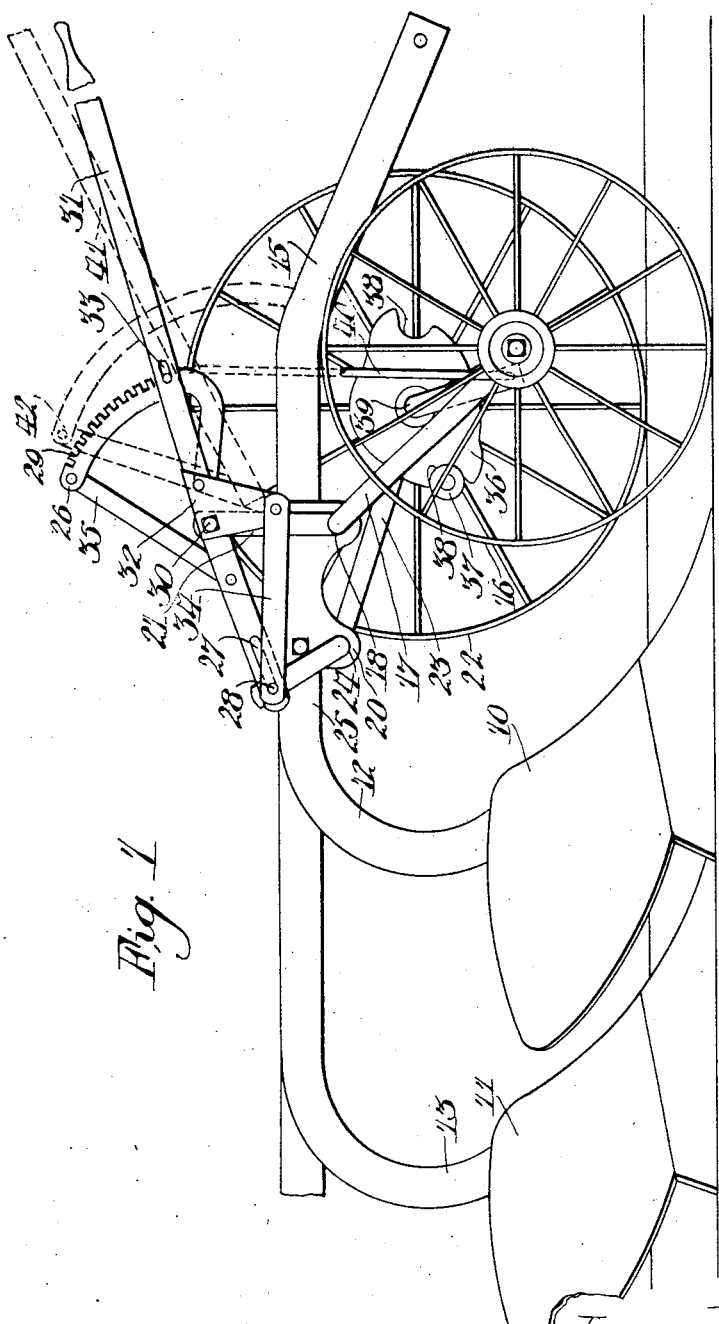

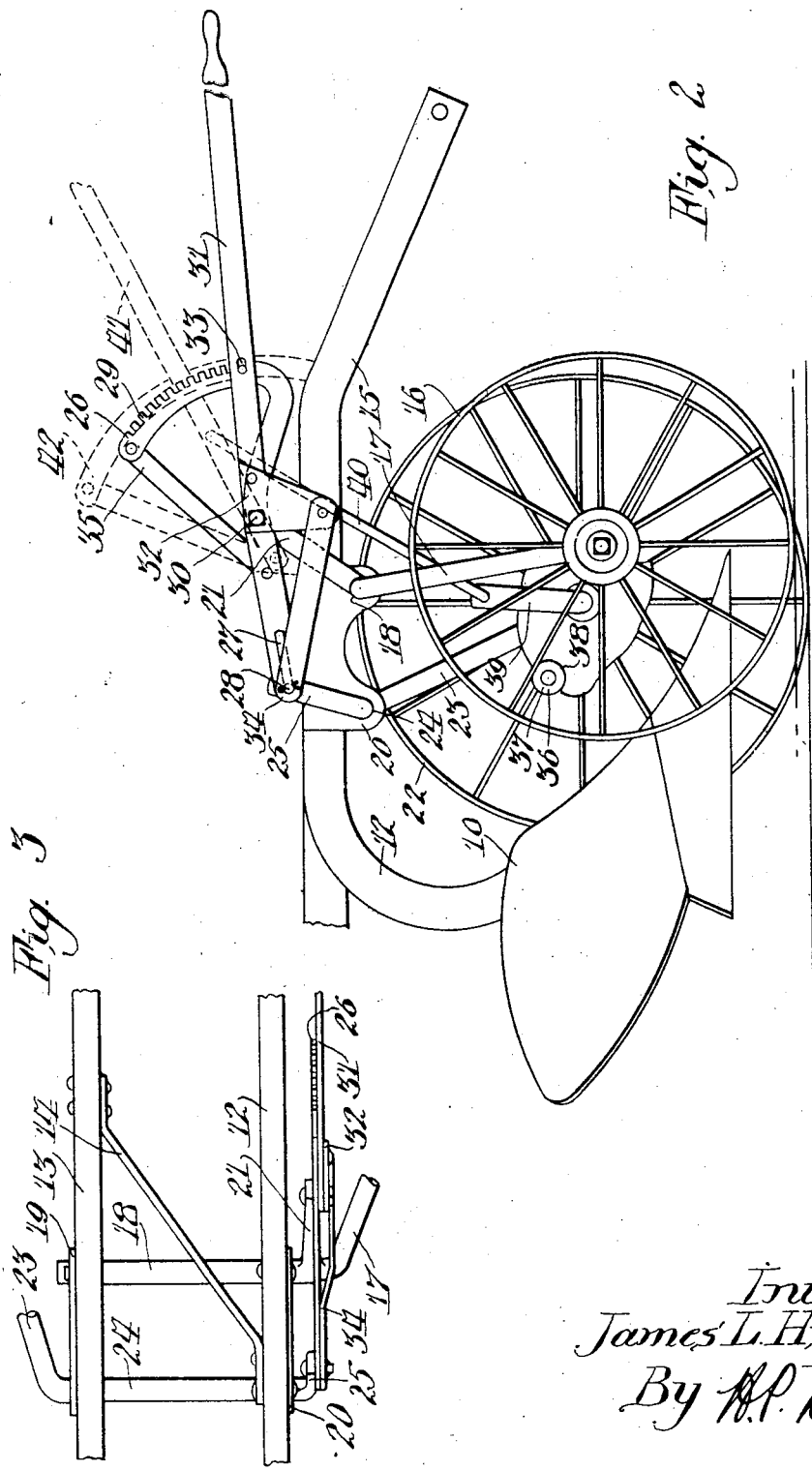

1,725,396

UNITED STATES PATENT OFFICE.

JAMES L. HIPPLE, OF CANTON, ILLINOIS, ASSIGNOR TO INTERNATIONAL HARVESTER COMPANY, A CORPORATION OF NEW JERSEY.

PLOW.

Application filed May 16, 1927. Serial No. 191,620.

This invention relates to improvements in wheel plows and more particularly to a controller connecting the crank axles of a multiple-axle wheel plow.

An object of the invention is to provide an improved adjustable connection between the cranked axles of tractor plows which will operate so that the controller lever for the connection does not move through a wide arc when the plow bottoms are elevated or lowered.

Another object of the invention is to provide a novel connection of the type stated particularly adapted for use with tractor drawn wheel plows.

Other objects of the invention will appear as the succeeding description progresses.

To illustrate the invention, drawings are annexed hereto showing an embodiment of the invention applied to a two-bottom power lift plow.

In the drawings,—

Figure 1 is a side elevation taken from the furrow side of the illustrative plow showing the improved connection in a selected setting with the plow bottoms in operative positions;

Figure 2 is a side elevation of the part of the plow shown in Figure 1, the illustrative connection being shown in position to which it is moved when the plow bottom has been elevated to inoperative position; and Figure 3 is a detailed plan view of the parts of the illustrative connection.

The illustrative plow includes two plow bottoms 10 and 11 having plow beams 12 and 13 extended forwardly in parallel positions so as to form with their connecting members, the frame of the plow. These plow beams are rigidly held in parallel positions by transverse members such as the bar 14, which is shown rigidly connected to each of the plow beams. At their forward ends the plow beams have downwardly extending portions 15 to which draft appliances may be attached.

The furrow wheel 16 is journaled on the crank arm 17 of the crank axle 18 mounted transversely of the plow beams, so that it may rotate relative thereto. In the illustrative construction the crank axle 18 is rotatably mounted in journal brackets 19 and 20 secured to the respective plow beams. An upstanding crank arm 21 is provided on the crank arm 18 in fixed relation thereto.

The land wheel 22 is rotatably mounted on the lower end of the crank arm 23 of a crank axle 24 preferably rotatably mounted in journal brackets 19 and 20 in position substantially parallel to the crank axle 18. An upstanding crank arm 25 is provided on the crank axle 24 on the end of that axle opposite the land wheel.

The upstanding crank arms 21 and 25 are connected by an adjustable connection including a controller which permits a power lift to swing the axles to cause the plow bottoms to be elevated or lowered without moving the controller handle through a wide arc or to substantial upright position, as in prior devices. The illustrative connection includes a sector 26 pivotally connected to the upper ends of each of the crank arms 21 and 25. This sector has a lost motion connection with the rear crank arm. This connection takes the form of a pin and slot connection, a closed slot 27 in the sector receiving the pivot pin 28 which passes through the upper end of the crank arm 25. The curved portion of the sector 26 providing lever stops 29 is preferably formed on an arc, the center of which is the center of the pivot pin 30 passing through the upper end of the crank arm 21. Pivotally mounted upon the pin 30 is the controller, herein shown as a bell crank lever 31, having the laterally extending arm 32 and detent mechanism 33, the latter cooperating with the stops 29 to maintain the controller lever in any selected condition.

In the construction shown in the drawings the end of the arm 32 is pivotally connected with the crank arm 25 through the agency of a link 34. When the detent is released and the controller lever 31 is moved relative to the sector 26, all of the parts of the controller will move relative to each other. The arms 21 and 25 will have relative movements, the sector 26 will have pivotal movement about the pin 30, and the sector will have sliding movement relative to the pin 28.

The sector 26 is rigidified by a brace 35 secured thereto at two positions, as clearly indicated in the drawings. The power lift mechanism, which is operative to raise the plow bottoms out of the ground, is of a well known type including an intermittently rotatable clutch part 36, a releasable roller 37 engaging in notches 38 on part 36, an intermittently driven crank arm 39, and a strut 40 pivotally connected to the crank arm. The strut 40 is pivotally connected to a lift lever 41 shown in dotted lines in the drawings. This lever cooperates with the detent sector 42, likewise shown in dotted lines.

The plow herein described is especially adapted for use with a tractor. When so used, the plow must be controlled by an operator stationed on the tractor forwardly of the plow. It is important, therefore, that all of the plow controls be kept at all times within convenient reach of the operator at this position. The illustrative connection maintains the adjusting lever 31 within such convenient reach of the operator at all positions of the plow bottoms. When the plow bottoms are elevated, the controller lever 31 is in a substantially horizontal position, as illustrated in Figure 2 of the drawings. The lowering of the plow bottoms into the operative position illustrated in Figure 1 so acts upon the controller that the lever 31 is only slightly elevated, its forward end still being within convenient reach of the operator upon the tractor.

It is to be noted that the connection is entirely carried by the crank arms 21 and 25 and that the connection and lever are generally moved as a unit in the general direction of the length of the lever 31 whenever the plow bottoms are elevated or lowered. The connection connects the crank arms 21 and 25 and carries with it the adjusting lever 31. These characteristics are believed to patentably distinguish the illustrative plow from all other plows of the prior art. It will be understood that the connection described permits adjustment of the furrow wheel for depth and to level the plow. Having in mind that link 34 is connected to a normally fixed point at pivot 28, it will be seen that movement of lever 31 on sector 29 will cause fore and aft movement of the sector and lever and, therefore, of arm 21 and the furrow wheel axle, slot 27 permitting this adjustment.

While the invention has been described with relation to a particular structure, it is to be understood that the invention is not limited to the details of that structure, but that it is of a scope commensurate with the scope of the appended claims.

What is claimed as new is:

1. A wheel plow comprising, in combination, a plow bottom, a plow beam connected to the plow bottom, a land-wheel, a furrow-wheel, a furrow-wheel crank axle, a land-wheel crank axle, a crank arm on each crank axle, and means connecting and supported by the crank arms; said means including a bell crank lever pivoted on the furrow-wheel crank arm, a link pivotally connecting the bell crank with the land-wheel crank arm, a sector pivoted on the furrow-wheel crank arm and formed with a slot for connection with the land-wheel crank arm, and a single pivot pin extending through the slot in the sector and the link and the land-wheel crank arm.

2. A wheeled plow comprising, in combination, a plow carrying beam, land wheel and furrow wheel cranked axles journaled on the beam in parallel relation, a crank arm on each cranked axle, means for swinging the land wheel cranked axle, a connecting member pivoted to one crank arm and having a lost motion connection with the other, a forwardly facing sector in fixed relation to said connecting member, a forwardly extending adjusting lever pivoted on one of said arms and having an angular extension to its pivotal end, a latch connection between said lever and sector, and a link connecting the other crank arm with said angular extension.

3. A wheeled plow comprising, in combination, a plow carrying beam, land wheel and furrow wheel cranked axles journaled on the beam in parallel relation with the furrow wheel in advance of the land wheel axle, a crank arm on each cranked axle, means for swinging the land wheel axle, a forwardly facing sector pivotally mounted on the crank arm of the furrow wheel axle and provided with a rearward extension connected to the crank arm of the land wheel axle by a lost motion connection, a forwardly extending adjusting lever pivoted on the crank arm of the furrow wheel axle on the same axis as the sector and having a depending angular extension at its pivotal end, a latch connection between said lever and the sector, and a link connecting the crank arm on the land wheel with said angular extension.

In testimony whereof I affix my signature.

JAMES L. HIPPLE.